United States Patent
Toshima

(10) Patent No.: US 9,405,042 B2
(45) Date of Patent: Aug. 2, 2016

(54) LIGHT-SHIELDING MATERIAL FOR OPTICAL INSTRUMENT AND MANUFACTURING METHOD THEREOF

(75) Inventor: Yasumaro Toshima, Saitama (JP)

(73) Assignee: KIMOTO CO., LTD. (JP)

( * ) Notice: Subject to any disclaimer, the term of this patent is extended or adjusted under 35 U.S.C. 154(b) by 101 days.

(21) Appl. No.: 14/008,695

(22) PCT Filed: Feb. 29, 2012

(86) PCT No.: PCT/JP2012/055054
§ 371 (c)(1),
(2), (4) Date: Sep. 30, 2013

(87) PCT Pub. No.: WO2012/132728
PCT Pub. Date: Oct. 4, 2012

(65) Prior Publication Data
US 2014/0016203 A1 Jan. 16, 2014

(30) Foreign Application Priority Data
Mar. 28, 2011 (JP) .................. 2011-071094

(51) Int. Cl.
| | | |
|---|---|---|
| G02B 1/00 | (2006.01) | |
| G02B 1/10 | (2015.01) | |
| G02B 5/22 | (2006.01) | |
| G02B 5/02 | (2006.01) | |
| G02B 5/00 | (2006.01) | |

(52) U.S. Cl.
CPC ........... *G02B 1/10* (2013.01); *G02B 5/003* (2013.01); *G02B 5/0226* (2013.01); *G02B 5/0268* (2013.01); *G02B 5/22* (2013.01); *G02B 5/223* (2013.01)

(58) Field of Classification Search
CPC ...... G02B 1/10; G02B 5/0226; G02B 5/0268; G02B 1/11; G02B 1/111; G02B 1/113; G02B 5/00; G02B 5/02; G02B 5/0205; G02B 5/003

USPC ............... 359/602, 603, 227–229, 488.01
See application file for complete search history.

(56) References Cited

U.S. PATENT DOCUMENTS

| | | | | |
|---|---|---|---|---|
| 5,981,048 | A * | 11/1999 | Sugimoto | B32B 27/32 206/524.1 |
| 6,628,355 | B1 * | 9/2003 | Takahara | H04N 9/3167 348/E9.027 |
| 6,818,287 | B1 * | 11/2004 | Ogawa et al. | 428/292.1 |
| 6,921,580 | B2 * | 7/2005 | Akatsu et al. | 428/480 |
| 2003/0185557 | A1 * | 10/2003 | Sakurai | G03B 9/00 396/488 |
| 2004/0058284 | A1 * | 3/2004 | Yoneyama | G03C 7/36 430/505 |
| 2005/0260529 | A1 * | 11/2005 | Oyamada et al. | 430/348 |
| 2006/0172236 | A1 * | 8/2006 | Maeda | G03C 3/00 430/619 |
| 2006/0233972 | A1 * | 10/2006 | Muramatsu | C08J 7/045 428/1.31 |
| 2007/0040963 | A1 * | 2/2007 | Maruyama | G02F 1/133528 349/96 |
| 2007/0046864 | A1 * | 3/2007 | Maruyama | G02B 5/3083 349/96 |
| 2009/0017277 | A1 * | 1/2009 | Nakahira | G03C 1/30 428/209 |
| 2009/0268299 | A1 * | 10/2009 | Furui et al. | 359/601 |

* cited by examiner

*Primary Examiner* — Bumsuk Won
*Assistant Examiner* — William R Alexander
(74) *Attorney, Agent, or Firm* — Bacon & Thomas, PLLC

(57) ABSTRACT

Provided is a method of manufacturing a light-shielding material for use in optical instrument and having a light-shielding coat with a broad low-gloss region while maintaining the physical properties, such as a light-blocking property, necessary for light-shielding coat. In this method for manufacturing a light-shielding material comprising a light-shielding coat formed on the substrate, a coating liquid is prepared containing at least a binder resin, black fine particles and a matting agent having a variation coefficient of 20 or larger. Next, this coating liquid is coated on the substrate and dried to form a light-blocking coat.

17 Claims, No Drawings

LIGHT-SHIELDING MATERIAL FOR OPTICAL INSTRUMENT AND MANUFACTURING METHOD THEREOF

TECHNICAL FIELD

The present invention relates to a method of manufacturing a light-shielding material suitably used in a light-shielding parts of various optical instruments and particularly having a full delustering property and relates to a light-shielding material manufactured by this method.

BACKGROUND ART

As a light-shielding material used for light-shielding parts as typified by a shutter and diaphragm, there is known a light-shielding sheet obtained by providing a light-shielding coat containing an organic filler on a film substrate made of a synthetic resin (Patent Document 1).

RELATED ART DOCUMENT

Patent Document

Patent Document 1: Japanese Unexamined Patent Publication (Kokai) No. H07-319004

SUMMARY OF THE DISCLOSED SUBJECT MATTER

In the patent document 1, since a light-shielding coat is formed on a film substrate by using a coating liquid containing an organic filler, wherein only an average particle diameter is controlled, a delustering property of the light-shielding coat was not reliable. Specifically, although reflection of an incident light at an angle close to the vertical angle with respect to a surface of the light-shielding coat is suppressed, it reflects an incident light at an angle close to the horizontal direction. This reflection became a defect called ghost in optical instruments and caused a decline of product performance. Therefore, the technique in the patent document 1 was unable to absorb incident lights of all angles.

Also, in the patent document 1, a coating liquid containing an organic filler wherein only an average particle diameter is controlled, therefore, a range of film thickness of the light-shielding coat, with which low glossiness can be obtained, was very narrow and formation thereof was not easy.

Note that a light-shielding property has to be also satisfactory besides the low glossiness against incident lights at all angles so as to maintain the product performance as a light-shielding material.

According to an aspect of the present invention, there is provided a method of manufacturing a light-shielding material for optical instrument having a light-shielding coat with a broad range of an incident angle, with which low glossiness can be obtained, (hereinafter, referred to as a low-gloss region) while maintaining a light-shielding property and other necessary physical properties of the light-shielding coat, and a light-shielding material for optical instrument manufactured by this method. As another aspect of the present invention, there is provided a coating liquid for forming a light-shielding coat, with which light-shielding coats having a broad low-gloss region can be formed to be a various film thicknesses.

The present inventors pursued study by focusing not on an average particle diameter but on a particle size distribution as a standard of selecting a matting agent, which would contribute directly to a delustering effect (same meaning as low glossiness) of the light-shielding coat. As a result, they found that, by adopting a matting agent having a broad particle size distribution at a certain particle diameter, it is possible to surely suppress reflection lights of incident lights even having an angle close to the horizontal direction (for example, 85 degrees) with respect to the surface of the light-shielding coat, not to mention those having an angle close to the vertical direction (for example, 20 degrees) and 60 degrees, and to widen a low-gloss region while maintaining necessary physical properties of the light-shielding coat.

They also found that, by adopting a specific matting agent as explained above, a light-shielding coat with a broad low gloss region can be formed to have a various film thicknesses, that is, a proper film thickness range, with which low glossiness can be obtained, can be made broader.

Namely, a method of manufacturing a light-shielding material for optical instrument according to the present invention is a method of manufacturing a light-shielding material for optical instrument, wherein a light-shielding coat is formed on a substrate, characterized by preparing a coating liquid comprising at least a binder resin, black fine particles and a matting agent having a variation coefficient of 20 or larger, applying the coating liquid on the substrate and drying to form a light-shielding coat.

A light-shielding material for optical instrument according to the present invention is a light-shielding material for optical instrument having a light-shielding coat comprising at least a binder resin, black fine particles and a matting agent formed on a substrate, characterized in that the light-shielding coat is formed by using a coating liquid comprising a matting agent having a variation coefficient of 20 or larger, and specular gloss at 60 degrees (G60) is adjusted to be lower than 1, and specular gloss at 85 degrees (G85) is adjusted to be lower than 15.

A coating liquid for forming a light-shielding coat according to the present invention is a coating liquid for forming the light-shielding coat of a light-shielding material for optical instrument having the light-shielding coat formed on a substrate, characterized in that at least a binder resin, black fine particles, a matting agent and a solvent are contained, and the matting agent has a variation coefficient of 20 or larger.

According to the method of the invention above, since a coating liquid containing a matting agent having a variation coefficient of 20 or larger is used, a light-shielding coat having a full delustering effect with a broad low-gloss region can be formed on a substrate. Also, since the coating liquid contains a binder resin and black fine particles, a light-shielding property and other necessary physical properties can be also maintained in the light-shielding coat to be formed.

According to the light-shielding material for optical instrument manufactured by the method of the invention above, since the light-shielding coat is formed by using a coating liquid containing a matting agent having a variation coefficient of 20 or larger, the light-shielding coat is provided with a full delustering effect (low at, for example, all of G20, G60 and G85, which will be explained later on) with a broad low-gloss region.

According to the coating liquid of the invention above, since a matting agent having a variation coefficient of 20 or larger is contained, a light-shielding coat provided with a full delustering effect with a broad low-gloss region can be formed to have a various film thicknesses easily. As explained above, since the coating liquid used in the patent document 1 contains an organic filler, wherein only an average particle diameter is controlled, a range of film thickness of the light-shielding coat, with which low glossiness can be obtained, was almost pinpoint, controlling a condition of presence of the organic filler was extremely difficult and workability was poor.

EXEMPLARY MODE FOR CARRYING OUT THE DISCLOSED SUBJECT MATTER

Below, an embodiment of the present invention will be explained.

A light-shielding material for optical instrument according to the present embodiment can be suitably used for light-shielding parts of optical instruments, such as a camera (including a camera-equipped cellular phone) and a projector, and comprises a substrate. A light-shielding coat is formed on at least one surface of the substrate. The light-shielding coat of the present embodiment is configured by containing at least a binder resin, black fine particles and a matting agent.

A thickness of the light-shielding coat can be changed arbitrarily in accordance with a use purpose of applying the light-shielding material, however, normally 2 μm to 15 μm is preferable, 2 μm to 12 μm is more preferable and 2 μm to 10 μm or so is furthermore preferable. This is for the increasing demands for a thinner layer (for example, thinner than 6 μm or so) particularly to the light-shielding coat in recent years. In the present embodiment, since a coating liquid containing a specific matting agent is used as will be explained later on, even when a thickness of the light-shielding coat formed on the substrate is 2 μm, low glossiness can be attained easily, arising of a pinhole, etc. on the light-shielding coat can be prevented easily and a required and sufficient light-shielding property can be obtained easily. When it is 15 μm or thinner, cracks on the light-shielding coat is prevented easily.

The light-shielding coat in the present embodiment is formed by using a coating liquid containing a specific matting agent, consequently, a specular gloss at 60 degrees (G60) is lower than 1, preferably lower than 0.7, more preferably lower than 0.5 and furthermore preferably lower than 0.3. A specular gloss at 85 degrees (G85) is lower than 15, preferably lower than 10, more preferably lower than 8 and furthermore preferably lower than 6. Note that the light-shielding coat of the present embodiment also has a specular gloss at 20 degrees (G20) of lower than 0.3 besides G60 and G85.

The specular gloss is a parameter indicating a degree of reflection of an incident light on the surface of the light-shielding coat. It is considered that the smaller the value is, the lower the glossiness is, and that the lower the glossiness is, the more a delustering effect can be obtained. The specular gloss at 60 degrees is a parameter indicating that how much of 100 lights irradiated at an angle of 60 degrees is reflected to a light receiving portion (irradiated to the light receiving portion) inclined by 60 degrees to the opposite side when assuming that the vertical direction with respect to the surface of the light-shielding coat is 0 degree. The specular gloss at 85 degrees and that at 20 degrees are based on the same idea.

In the present embodiment, since the light-shielding coat is formed by using a coating liquid containing a specific matting agent, a surface of the light-shielding coat is controlled to be a specific shape and the light-shielding coat can obtain a full delustering effect with a broad low-gloss region.

Next, an example of a manufacturing method of a light-shielding material for optical instruments having the configuration above.

Note that "an average particle diameter" in this specification indicates a median diameter (D50) measured by a laser diffraction particle size analyzer (for example, SALD-7000, etc. made by Shimazu Corporation).

A CV (coefficient of variation) value in this specification means a variation coefficient (also indicated as a relative standard variation) of a particle size distribution used in preparing an application liquid. This value indicates what degree a spread of a particle size distribution (variation in particle diameter) is with respect to an average value (arithmetic average diameter) and is normally obtained by CV value (no unit)=(standard variation/average value). The smaller the CV value is, the narrower the particle size distribution becomes (sharp); while the larger, the broader the particle size distribution becomes (broad).

(1) Preparing Application Liquid for Forming Light-Shielding Coat First

An application liquid for forming a light-shielding coat used in the present embodiment comprises at least a binder resin, black fine particles, a matting agent and a solvent.

As a binder resin, for example, a poly(meth)acrylic acid-type resin, polyester resin, polyvinyl acetate resin, polyvinyl chloride, polyvinyl butyral resin, cellulose-type resin, polystyrene/polybutadiene resin, polyurethane resin, alkyd resin, acrylic resin, unsaturated polyester resin, epoxy ester resin, epoxy resin, acryl polyol resin, polyester polyol resin, polyisocyanate, epoxy acrylate-type resin, urethane acrylate-type resin, polyester acrylate-type resin, polyether acrylate-type resin, phenol-type resin, melamine-type resin, urea-type resin, diallyl phthalate-type resin and other thermoplastic resins or thermosetting resins may be mentioned; and one or a mixture of two or more of those may be used. When used for a heat resistant use purpose, a thermosetting resin is preferably used.

A content of a binder resin in non-volatile content (solid content) included in the application liquid is preferably 20 wt % or greater, more preferably 30 wt % or greater, and furthermore preferably 40 wt % or greater. When it is 20 wt % or greater, a decline of adhesiveness of the light-shielding coat to the substrate is prevented easily. On the other hand, a content of a binder resin in a non-volatile content in the application liquid is preferably 70 wt % or less, more preferably 65 wt % or less and furthermore preferably 60 wt % or less. When it is 70 wt % or less, a decline of necessary physical properties (light-shielding property, etc.) of the light-shielding coat is prevented easily.

Black fine particles are blended to color the binder resin with black so as to give a light-shielding property to a dried coating (light-shielding coat). As black fine particles, for example, carbon black, titanium black, aniline black, iron oxide, etc. may be mentioned. Among them, carbon black is particularly preferably used because it can provide the coating with both a light-shielding property and antistatic property at the same time. The reason why the antistatic property is also required in addition to the light-shielding property is because workability is taken into account at the time of cutting into a predetermined shape and putting the cut product (light-shielding part) as a part in optical instrument after producing the light-shielding material.

Note that when not using carbon black as the black fine particles, a conductive agent and antistatic agent may be blended in addition to the black fine particles.

To give a sufficient light-shielding property to the coating, the smaller an average particle diameter of the black fine particles is, the more preferable. In the present embodiment, those having an average particle diameter of, for example, smaller than 1 μm and preferably 500 nm or smaller may be used.

A content of black fine particles in a non-volatile content (solid content) included in the application liquid is preferably 5 wt % to 20 wt % and more preferably 10 wt % to 20 wt %.

When it is 5 wt % or greater, a decline of a light-shielding property as a necessary physical property of the light-shielding coat is prevented easily. When it is 20 wt % or less, adhesiveness and abrasion-resistance of the light-shielding coat improve and a decline of strength of the coating and high cost are prevented easily.

Next, details of a matting agent used in the present embodiment will be explained.

A matting agent contained in an application liquid for forming a light-shielding coat used in the present embodiment is generally for forming fine unevenness on a surface of the dried coating, reducing reflection of incident lights on the coating surface thereby to decline glossiness (specular gloss) of the coating and finally enhancing a delustering property of the coating. To obtain the delustering property, an organic filler, wherein only an average particle diameter is controlled, is used in the patent document 1, however, a full delustering property cannot be obtained by simply controlling an average particle diameter as explained above.

Therefore, as explained above, it was found in the present invention that a full delustering property can be obtained by devising a standard for selecting a matting agent, which can give a delustering property to a light-shielding coat directly.

Generally, there are organic-type and inorganic-type matting agents, and organic-type fine particles are used preferably in the present embodiment. As organic fine particles, for example, cross-linked acrylic beads (transparent, regardless of being colored or not), etc. may be mentioned. As inorganic fine particles, for example, silica, magnesium aluminometasilicate, titanium oxide, etc. may be mentioned.

In the present embodiment, inorganic fine particles may be also used, however, organic fine particles are used preferably in the present embodiment because organic fine particles give a full delustering effect more easily while maintaining strength of the coating.

Note that, in the present embodiment, "use of organic fine particles" includes the case of using both organic fine particles and inorganic fine particles in addition to the case of using only organic fine particles. When using inorganic fine particles together, a content of organic fine particles in the total matting agent may be, for example, 90 wt % or greater and preferably 95 wt % or greater.

In the present embodiment, in a certain particle diameter (explained later as an example), those having a CV value (variation coefficient of particle size distribution) of a specific value or larger were used. Specifically, matting agents (preferably organic fine particles) having a CV value in a certain particle diameter of 20 or larger, preferably 25 or larger and more preferably 30 or larger are used. By using such a matting agent, reflection lights of incident lights at all angles can be surely suppressed up to an angle close to the horizontal direction with respect to the surface of the light-shielding coat (for example, 85 degrees) not to mention an angle close to the vertical direction (for example 20 degrees) and 60 degrees, and a full delustering property can be obtained. As a result, there is no defect called ghost arising in an optical instrument, wherein a light-shielding material obtained in the present embodiment is applied.

In the present embodiment, the reason is not clear why an incident light at 85 degrees can be also prevented surely from reflecting as well as those at 20 degrees and 60 degrees (namely, all of G20, G60 and G85 can be suppressed low) when using a matting agent having a broad variation coefficient (CV value) of a particle size distribution. However, this phenomenon can be considered as explained below. First, when examining a reflection light amount of incident lights with various incident angles, in order to suppress the reflection light amount of lights at angles close to the vertical direction with respect to the layer surface of the light-shielding coat, low glossiness can be obtained if the surface is simply rough, while in order to suppress a reflection light amount of incident lights at angles close to the horizontal direction, such as G85, low glossiness cannot be obtained by only being simply rough in some cases. When studying thoroughly, in order to suppress reflection of incident lights from close to the vertical direction, a method of uniformly roughening with small unevenness is also effective; however, in order to suppress reflection of incident lights from close to the horizontal direction, it cannot be attained only by small unevenness and it was found that it is necessary that both the small unevenness and large unevenness are provided.

Here, when focusing on a particle size distribution of a matting agent, particle diameters are uniform in a sharp distribution, so that it is likely that sizes of unevenness become also uniform on a light-shielding coat formed from an application liquid using the matting agent. On the other hand, in the case of a matting agent with a broad particle size distribution, large and small particle diameters are contained with an average particle size as the center, and unevenness of a light-shielding coat formed from that includes large unevenness and small unevenness.

On a light-shielding coat comprising a matting agent with a broad particle size distribution as above, incident lights from close to the horizontal direction are blocked by large projections and hardly reach to the other direction, and the blocked light is considered to be absorbed by small unevenness or diffused to be attenuated. Accordingly, it is presumed that due to the proper provision of a matting agent with large and small particles and large and small unevenness, low glossiness can be attained also for G85 as well as G20 and G60.

Note that a means to lower all the G20, G60 and G85 by providing only large unevenness can be also considered, however, when forming the light-shielding coat only with large unevenness, the film thickness has to be thick necessarily, which opposes the trend for thinner films in recent years.

In the present embodiment, as to a particle diameter of a matting agent to be a standard of the CV value above, it is preferable to use the method below. The method is to determine a particle diameter of a matting agent to be used in accordance with a film thickness Tt of a light-shielding coat to be formed considering the fact that a product mode of the light-shielding material (particularly, a total thickness of a light-shielding material and a thickness of a light-shielding coat) varies depending on which part in optical instrument it is used. Specifically, with respect to a film thickness Tt of a light-shielding coat to be formed, a matting agent having an average particle diameter corresponding to 35% of the Tt or greater, preferably 40% or greater and more preferably 45% or greater and 110% of the Tt or less, preferably 105% or less and more preferably 100% or so or less is used preferably.

For example, when forming a light-shielding coat having a thickness after drying of 10 μm or thinner, which corresponds to a film thickness Tt, a matting agent having an average particle diameter of 3.5 μm or so to 11 μm or so may be used. When attaining 5 μm in a thickness after drying of the light-shielding coat, a matting agent having an average particle diameter of 1.75 μm or so to 5.5 μm or so may be used.

By applying the method explained above to a particle diameter of a matting agent as a standard of a CV value, a full delustering property can be obtained furthermore easily.

In the present embodiment, the film thickness Tt means an arithmetic average value obtained by measuring a dried light-shielding coat at 10 different points thereon by using a film thickness meter Millitron 1202-D (made by Mahr GmbH).

In the present embodiment, when applying an application liquid containing a broad matting agent and an application liquid containing a sharp matting agent respectively in a same adhesion amount, a film thickness Tt after drying of formed coating (light-shielding coat) becomes different in some cases. Comparing with a coating formed by using an application liquid containing a sharp matting agent, a coating formed by using an application liquid containing a broad matting agent contains a matting agent having larger particle diameters than a value of the average particle diameter and an actually measured film thickness is considered to be thicker due to the large-particle matting agent in the coating.

Note that according to the technique in the patent document 1 mentioned in the part of BACKGROUND ART above, a light-shielding coat is formed on a film substrate by using an organic filler having a considerably smaller particle diameter than a thickness of the light-shielding coat after drying (Refer to the examples. An organic filler having an average particle diameter of 3 µm is used in all the examples, and a film thickness of the light-shielding coat after drying is 10 µm in the examples 1 to 3 and 12 µm in the example 4.). However, when designed as such, the organic filler is likely to be buried in the light-shielding coat and it is difficult to control the organic filler to be present near the surface of the light-shielding coat. As a result, reflection of incident lights on the light-shielding coat surface cannot be decreased and glossiness (specular gloss) on the light-shielding coat cannot be lowered, and a delustering property of the light-shielding coat is hard to be enhanced eventually.

Even when assuming that the organic filler can be controlled to be present near the surface of the light-shielding coat, since an organic filler, wherein only an average particle diameter is controlled, is used in the patent document 1, a delustering property cannot be fully secured as explained above.

A content of a matting agent with respect to 100 parts by weight of a binder resin may be 50 parts by weight or more, preferably 60 parts by weight or more and more preferably 70 parts by weight or more and 170 parts by weight or less, preferably 140 parts by weight or less and more preferably 110 parts by weight or less. By blending a matting agent into an application liquid in the range above, it is possible to contribute to prevention of dropping of the matting agent off from the light-shielding coat due to sliding of a finally obtained light-shielding material and a decline of a sliding property of the light-shielding material and other various performances.

As a solvent, water, an organic solvent and a mixture of water and organic solvent, etc. may be used.

When used for the purpose, which does not require the light-shielding coat to have a high sliding property, such as the case of using a processed product of the light-shielding material produced in the present embodiment as an ultrathin spacer to be incorporated between respective lenses, it is not necessary to blend any lubricant (wax), which has been blended into the light-shielding coat conventionally. However, a lubricant may be blended in also in the case of being used for such a purpose.

When adding a granular lubricant, both of an organic type and inorganic type may be used. For example, polyethylene wax, paraffin wax and other hydrocarbon-type lubricants, stearic acid, 12-hydroxy stearic acid and other fatty acid-type lubricants, oleic amide, erucamide and other amide-type lubricants, stearic acid monoglyceride and other ester-type lubricants, alcohol-type lubricants, metallic soaps, talc, molybdenum disulfide and other solid lubricants, silicon resin particles, poly tetra fluoro ethylene wax and other fluorine resin particles, cross-linked polymethylmethacrylate particles, cross-linked polystyrene particles, etc. may be mentioned. When blending a granular lubricant, use of an organic-type lubricant is particularly preferable. Also, when adding a lubricant, which is liquid at normal temperature, fluorine-type compounds and silicon oil, etc. may be used, as well. When blending a lubricant, it is preferable to use those being liquid at normal temperature. It is because as far as the lubricant is liquid, it is hard to affect formation of uneven shapes on the light-shielding coat surface by a matting agent.

Note that as long as it is in a range of not undermining functions of the present invention, in accordance with need, additives, such as flame retardants, antibacterial agents, antifungal agents, antioxidants, plasticizers, leveling agents, fluidity control agents, defoaming agents and dispersants, may be blended into the application liquid for forming a light shielding coat.

(2) Next, the prepared application liquid for forming a light-shield coat is applied in an amount of attaining a film thickness Tt on a substrate, dried and, then, heated and pressurized, etc. as needed.

As a substrate, a polyester film, polyimide film, polystyrene film, polycarbonate film, and other synthetic resin films may be mentioned. Among them, a polyester film is preferably used, and an oriented, particularly, biaxially-oriented polyester film is particularly preferable in terms of excellent mechanical strength and dimension stability. Also, a polyimide film is preferably used for heat resistant purpose.

As the substrate, not to mention transparent ones, a thin-film metal plate, wherein a substrate itself has a light-shielding property and strength, may be also used besides foamed polyester films and synthetic resin films containing black pigment, such as carbon black, or other pigment. In that case, suitable one for each use purpose may be selected as the substrate. For example, when used as a light-shielding material and a high light-shielding property is required, a synthetic resin film containing same kind of black fine particles as those explained later or a thin-film metal plate may be used, while in other cases, a transparent or foamed synthetic resin film may be used. Since a sufficient light-shielding property as a light-shielding material can be obtained from the light-shielding coat itself formed in the later-explained method, when containing black fine particles in a synthetic resin film, it is good enough to contain to an extent that the synthetic resin film looks visually black, that is, the optical transmission density becomes 2 or so.

A thickness of the substrate is generally 6 µm to 250 µm or so in terms of strength and stiffness, etc. as a lightweight light-shielding material although it varies depending on the use purpose. In terms of improving adhesiveness to the light-shielding coat, the substrate may be subjected to an anchor treatment, corona treatment, plasma treatment or EB treatment as needed.

An application method of the application liquid is not particularly limited and may be performed by a conventional well-known method (for example, dip coating, roll coating, bar coating, die coating, blade coating and air knife coating, etc.).

The application liquid prepared in the present embodiment has a specific gravity of approximately 0.9 to 1.2 or so and a solid content (NV) thereof is adjusted to normally 5% or greater, preferably 10% or greater and normally 40% or less and preferably 30% or less or so. The application liquid is applied to the substrate in an adhesion amount of normally 6 g/m² or more, preferably 8 g/m² or more and more preferably 10 g/m² or more and normally 100 g/m² or less, preferably 80 g/m² or less and more preferably 60 g/m² or less or so.

Through the steps above, a light-shielding material is obtained, wherein a light-shielding coat is formed to have a film thickness Tt on a substrate.

According to the present embodiment, by using a coating liquid containing a matting agent having a variation coefficient of 20 or larger, a light-shielding material obtained by forming a light-shielding coat on a substrate is manufactured. Therefore, it is possible to obtain a light-shielding material having a light-shielding coat provided with a full delustering effect with a broad low-gloss region. Since the coating liquid contains a binder resin and black fine particles, a light-shielding coat to be formed can maintain necessary physical properties, such as a light-shielding property.

According to the light-shielding material for optical instrument manufactured in the method according to the present embodiment, since a light-shielding coat is formed by using a coating liquid containing a matting agent having a variation coefficient of 20 or larger, the light-shielding coat can be provided with a full delustering effect with a broad low-gloss region (low at all of G20, G60 and G85).

The full delustering effect explained above is useful for use purposes wherein a thinner light-shielding coat (for example, 6 µm or so or thinner) is required particularly. For example, in a camera (image pickup device) as an example of optical instrument, a plurality of lenses are used in a lens part of a photographing optical system and an ultrathin spacer is incorporated between respective lenses. It is particularly useful when applying the light-shielding material obtained by the method of the present invention to the spacers and inner walls, etc. of the photographing optical system. It is a matter of course that it can be applied to parts like a shutter and diaphragm as conventionally used.

In the present embodiment, since a coating liquid containing a matting agent having a variation coefficient of 20 or larger is used, light-shielding coats provided with a full delustering effect with a broad low-gloss region can be formed to be various film thicknesses.

EXAMPLES

Below, the present invention will be explained furthermore with examples. Note that "part" and "%" are based on weight unless otherwise mentioned.

1. Producing Light-Shielding Material Samples

Examples 1-1 to 8-3

A black PET film having a thickness of 25 µm (Lumirror X30: Toray Industries, Inc.) was used as a substrate, and application liquids 'a' to 'h' of the formulas below were applied respectively on both surfaces thereof by using a bar coating method. Contents (parts in terms of solid content) of acryl polyol, etc. in respective application liquids are shown in Table 1. The respective application liquids were all prepared to have a solid content of 20%.

After that, light-shielding coats A1 to H3 were formed after drying, so that light-shielding material samples of respective examples were produced. Adhesion amounts of respective application liquids are shown in Table 2 below.

<Formulas of Application Liquids 'a' to 'h' for Forming Light-Shielding Coat>

| | |
|---|---:|
| acryl polyol (solid content 50%) (ACRYDIC A807: DIC Corporation) | 153.8 parts |
| isocyanate (solid content 75%) (BURNOCK DN980: DIC Corporation) | 30.8 parts |
| carbon black (average particle diameter 25 nm) (TOKABLACK #5500: Tokai Carbon Co., Ltd.) | 24 parts |
| matting agent listed in Table 1 (parts listed in Table 1) | |
| methyl ethyl ketone and toluene | 611.4 to 1091.4 parts |

TABLE 1

| | Binder Resin | | | | Matting Agent | | | | | | | |
|---|---|---|---|---|---|---|---|---|---|---|---|---|
| Application Liquid | Acryl Polyol | Isocyanate | Total | Carbon Black | X1 | X2 | X3 | X4 | X5 | Kind | Averate Particle Diameter (µm) | CV Value |
| a | 76.9 | 23.1 | 100 | 24 | 90 | — | — | — | — | Transparent | 5 | 31.4 |
| b | | | | | 50 | — | — | — | — | Transparent | 5 | 31.4 |
| c | | | | | 125 | — | — | — | — | Transparent | 5 | 31.4 |
| d | | | | | 170 | — | — | — | — | Transparent | 5 | 31.4 |
| e | | | | | — | 90 | — | — | — | Transparent | 5 | 8.45 |
| f | | | | | — | — | 90 | — | — | Black | 3 | 54.1 |
| g | | | | | — | — | — | 90 | — | Transparent | 3 | 29.5 |
| h | | | | | — | — | — | — | 90 | Transparent | 3 | 10.7 |

Note that, in Table 1, both of the matting agents X1 and X2 are transparent acrylic beads having an average particle diameter of 5 μm, however, their coefficients of variation (CV values) of particle size distributions are different. The CV values are 31.4 in the matting agent X1, which is a broad product, and 8.45 in the matting agent X2, which is a sharp product.

Also, a matting agent X3 is black acrylic beads having an average particle diameter of 3 μm and matting agents X4 and X5 are both transparent acrylic beads having an average particle diameter of 3 μm, however, their variation coefficients of particle size distributions are different. The CV values are 54.1 in the matting agent X3, which is a broad product, 29.5 in the matting agent X4, which is a broad product and 10.7 in the matting agent X5, which is a sharp product.

Below, the matting agents X1 and X2 will be also referred to as transparent 5 μm broad and transparent 5 μm sharp, respectively. Also, the matting agents X3, X4 and X5 will be also referred to as black 3 μm broad, transparent 3 μm broad and transparent 3 μm sharp, respectively.

2. Evaluation

The obtained light-shielding material samples obtained in the respective examples were evaluated on physical properties by the methods below. The results are shown in Table 2. Note that Table 2 also shows application amounts of application liquids in Table 1 and film thicknesses of formed light-shielding coats, etc.

Note that evaluation of a light-shielding property in (1) below was made by using samples formed by applying respective application liquids of formulas in the respective examples above in an adhesion amount of 14 g/m² on one surface of a transparent polyethylene terephthalate film (Lumirror T60: Toray Industries, Inc.) having a thickness of 25 μm and drying.

(1) Evaluation on Light-Shielding Property

Optical transmission densities of samples in respective examples were measured based on JIS-K7651:1988 by using an optical densitometer (TD-904: Gretag Macbeth). The results are indicated by "0" for those with measurement values exceeding 4.0 and " " for those not exceeding 4.0. Note that a UV filter was used in the optical density measurement.

(2) Evaluation on Conductivity

Surface resistivity (Ω) of light-shielding material samples obtained in the respective examples was measured based on JIS-K6911:1995. Those with a measurement value of 1.0 $10^6 \Omega$ or smaller are evaluated as "0", those exceeding 1.0 $10^6 \Omega$ but not exceeding 1.0 $10^{10} \Omega$ are "Δ" and those exceeding 1.0 $10^{10} \Omega$ are " ".

(3) Evaluation on Delustering Property

On the light-shielding material samples obtained in the respective examples, specular gloss (unit: %) at 20 degrees, 60 degrees and 85 degrees (G20, G60 and G85) on the light-shielding coat surfaces was measured based on JIS-Z8741:1997 by using a glossimeter (product name: VG-2000, Nippon Denshoku Industries Co., Ltd.).

As to G20, those with a measurement value of smaller than 0.3 are evaluated as "⊚⊚", those with 0.3 or greater but smaller than 0.5 are "⊚", those with 0.5 or greater but smaller than 0.7 are "○" and those with 0.7 or greater are " ". As to G60, those with a measurement value of smaller than 0.5 are "⊚⊚", those with 0.5 or greater but smaller than 0.7 are "⊚", those with 0.7 or greater but smaller than 1 are "○" and those with 1 or greater are " ". As to G85, those with a measurement value of smaller than 8 are "⊚⊚", those with 8 or greater but smaller than 10 are "⊚", those with 10 or greater but smaller than 15 are "○" and those with 15 or greater are " ".

It was observed that the smaller the respective measurement values in G20, G60 and G85 were, the lower the glossiness was, and that the lower the glossiness, the more excellent in a delustering property.

TABLE 2

| | Application Liquid | | | Average Particle Diameter of Matting Agent/ | | Performance | | | | |
|---|---|---|---|---|---|---|---|---|---|---|
| Example | Formulas | Adhesion Amount (g/m²) | Kind | Film Thickness (μm) | Film Thickness (%) | Light-Shielding Property | Conductivity | G20 | G60 | G85 |
| 1-1 | a | 14 | A1 | 5.5 | 91 | ○ | ○ | ⊚⊚ | ⊚⊚ | ⊚⊚ |
| 1-2 | a | 28 | A2 | 8 | 63 | ○ | ○ | ⊚⊚ | ⊚⊚ | ⊚⊚ |
| 1-3 | a | 46 | A3 | 10 | 50 | ○ | ○ | ⊚⊚ | ⊚⊚ | ⊚⊚ |
| 2 | b | 14 | B | 5.1 | 98 | ○ | ○ | ⊚ | ⊚⊚ | ⊚⊚ |
| 3 | c | 14 | C | 6.1 | 82 | ○ | ○ | ⊚⊚ | ⊚⊚ | ⊚⊚ |
| 4 | d | 14 | D | 6.9 | 72 | ○ | ○ | ⊚⊚ | ⊚⊚ | ⊚⊚ |
| 5-1 | e | 14 | E1 | 5 | 100 | ○ | ○ | ⊚⊚ | ○ | X |
| 5-2 | e | 28 | E2 | 7 | 71 | ○ | ○ | ⊚⊚ | ○ | X |
| 5-3 | e | 46 | E3 | 9 | 56 | ○ | ○ | ⊚⊚ | ○ | X |
| 6-1 | f | 11 | F1 | 4 | 75 | ○ | ○ | ⊚⊚ | ⊚⊚ | ⊚⊚ |
| 6-2 | f | 18 | F2 | 4.9 | 61 | ○ | ○ | ⊚⊚ | ⊚⊚ | ⊚⊚ |
| 6-3 | f | 32 | F3 | 7.8 | 38 | ○ | ○ | ⊚⊚ | ⊚⊚ | ⊚⊚ |
| 7-1 | g | 11 | G1 | 3.3 | 91 | ○ | ○ | ⊚⊚ | ⊚⊚ | ⊚ |
| 7-2 | g | 18 | G2 | 4.8 | 63 | ○ | ○ | ⊚⊚ | ⊚⊚ | ⊚ |
| 7-3 | g | 32 | G3 | 7.6 | 39 | ○ | ○ | ⊚⊚ | ⊚⊚ | ⊚ |
| 8-1 | h | 11 | H1 | 3 | 100 | ○ | ○ | ⊚⊚ | ○ | X |
| 8-2 | h | 18 | H2 | 4 | 75 | ○ | ○ | ⊚⊚ | ○ | X |
| 8-3 | h | 32 | H3 | 6.4 | 47 | ○ | ○ | ⊚⊚ | ○ | X |

3. Consideration

From Table 2, the followings can be understood. In all examples, a light-shielding property and conductivity of the formed light-shielding coat were preferable. However, an evaluation on a delustering property at G85 was low in those using a sharp product as a matting agent (example 5-1 to example 5-3 and example 8-1 to example 8-3).

On the other hand, those using a broad product as a matting agent (the example 1-1 to example 1-4 and example 6-1 to example 7-3) exhibited excellent results on a delustering property also at G85 as well as at G20 and G60. Particularly those using a broad product having a CV value of 30 or larger (the example 1-1 to example 4 and examples 6-1 to 6-3) were confirmed to exhibit a furthermore excellent effect at G85 comparing with that in those using a broad product having a CV value of 20 or larger but smaller than 30 (the example 7-1 to example 7-3).

4. Evaluation on Proper Film Thickness Range

The application liquid "a" using a matting agent X1, transparent 5 μm broad, was used and applied to one surfaces of PET films with adhesion amounts of 14 g/m², 28 g/m², 46 g/m² and 81 g/m², respectively. After that, a light-shielding coats A1 (5.5 μm), A2 (8 μm), A3 (10 μm) and A5 (15 μm) were formed by drying, so that light-shielding material samples were produced.

The application liquid "e" using a matting agent X2, transparent 5 μm sharp, was used and applied to one surfaces of PET films with adhesion amounts of 14 g/m², 28 g/m², 46 g/m² and 81 g/m², respectively. After that, a light-shielding coats E1 (5 μm), E2 (7 μm), E3 (9 μm) and E5 (15 μm) were formed by drying, so that light-shielding material samples were produced.

The respective samples were evaluated on (3) above. As a result, samples using the application liquid "a" exhibited small values at all of G20, G60 and G85, consequently, the glossiness was observed to be low and a full delustering effect was provided. On the other hand, as to samples using the application liquid "e", only the samples with a light-shielding coat E4 formed to have a film thickness of 15 μm were observed to exhibit small values at G20, G60 and G85, however, those with a coat having other film thicknesses did not have a full delustering effect.

From the above, it was confirmed that, by using the matting agent X1, a full delustering effect can be obtained and a film thickness range of a light-shielding coat can be wide comparing with the case of using the matting agent X2.

Example 9

Other than blending silicon oil as a liquid lubricant to be 3% in the application liquid "a" used in the example 1-1 to prepare the application liquid "i", a light-shielding coat I was formed on the substrate under the same condition as that in the example 1-1 and light-shielding material samples of example 9 were produced.

After that, when the delustering property was evaluated under the same condition as that in the example 1-1, equivalent efficiency was obtained to that in the case of the example 1-1, however, a sliding property was observed to be superior comparing with that in the example 1-1. Specifically, a coefficient of static friction (μs) was 0.35 or smaller and a coefficient of dynamic friction (μk) was 0.25 or smaller, namely, it was possible to improve the sliding property without affecting the surface properties of the light-shielding coat.

Note that μs and μk in the present example are based on JTS-K7125:1999 and are values measured under the condition of a load: 200 g and a rate: 100 mm/min.

The invention claimed is:

1. A method of manufacturing a light-shielding material for an optical instrument, having an optical transmission density exceeding 4.0, comprising a light-shielding coat having a single-layer structure, wherein at least black fine particles and a matting agent are dispersed uniformly in a binder resin, formed on a substrate, characterized by:
    preparing a coating liquid comprising at least a binder resin, black fine particles and a matting agent having a variation coefficient of 20 or larger and an average particle diameter corresponding to 35 to 110% of a film thickness of the light-shielding coat, applying the coating liquid on the substrate and drying to form a light-shielding coat.

2. The method of manufacturing a light-shielding material for optical instrument according to claim 1, characterized in that the matting agent is organic fine particles having an average particle diameter of 10 μm or smaller.

3. The method of manufacturing a light-shielding material for optical instrument according to claim 1, characterized in that the matting agent in an amount of 50 parts by weight or more and 170 parts by weight or less is contained in the coating liquid with respect to 100 parts by weight of a binder resin.

4. A light-shielding material for an optical instrument, having a light-shielding coat having a single-layer structure, wherein at least black fine particles and a matting agent are dispersed uniformly in a binder resin, formed on a substrate, characterized in that:
    the light-shielding coating is formed by using a coating liquid comprising a matting agent having a variation coefficient of 20 or larger and an average particle diameter corresponding to 35 to 110% of a film thickness of the light-shielding coat; and
    specular gloss at 60 degrees is adjusted to be lower than 1, and specular gloss at 85 degrees is adjusted to be lower than 15.

5. A coating liquid for forming a light-shielding coat of a light-shielding material for an optical instrument, having an optical transmission density exceeding 4.0, wherein the light-shielding material comprises the light-shielding coat having a single-layer structure, wherein at least black fine particles and a matting agent are dispersed uniformly in a binder resin, formed on a substrate, characterized in that:
    at least a binder resin, black fine particles, a matting agent and a solvent are contained; and
    the matting agent has a variation coefficient of 20 or larger and an average particle diameter corresponding to 35 to 110% of a film thickness of the light-shielding coat.

6. An optical part comprising the light-shielding material according to claim 4.

7. An image pickup device comprising the optical part according to claim 6.

8. The method of manufacturing a light-shielding material for optical instrument according to claim 1, characterized in that the matting agent in an amount of 50 parts by weight or more and 170 parts by weight or less is contained in the coating liquid with respect to 100 parts by weight of a binder resin.

9. The method of manufacturing a light-shielding material for optical instrument according to claim 2, characterized in that the matting agent in an amount of 50 parts by weight or more and 170 parts by weight or less is contained in the coating liquid with respect to 100 parts by weight of a binder resin.

10. The method of manufacturing a light-shielding material for optical instrument according to claim 1, wherein the coating liquid further includes a lubricant being liquid at normal temperature.

11. The method of manufacturing a light-shielding material for optical instrument according to claim 1, wherein the coating liquid further includes a lubricant being liquid at normal temperature.

12. The coating liquid for forming a light-shielding coat of a light-shielding material for optical instrument according to claim 5, wherein the coating liquid is configured to further include a lubricant being liquid at normal temperature.

13. A part of an image pickup device comprising the light-shielding material according to claim 4.

14. The part of an image pickup device according to claim 13, which is an ultrathin spacer incorporated between a plurality of lenses used in a lens part of a photographing optical system.

15. The part of an image pickup device according to claim 13, which is an inner wall part of a photographing optical system.

16. The part of an image pickup device according to claim 13, which is a shutter blade of a camera.

17. The part of an image pickup device according to claim 13, which is a diaphragm blade of a camera.

* * * * *